3,847,979
ADDITION OF SULFUR TO ALKYLDIHALOGEN-
PHOSPHINE
James C. Richards, 160 Alpine Trail, Sparta, N.J. 07871,
and Edward B. Trescott, 5407 Forge Road, White-
marsh, Md. 21162
No Drawing. Continuation-in-part of application Ser. No.
8,694, Feb. 4, 1970. This application Aug. 18, 1972,
Ser. No. 281,679
Int. Cl. C07f 9/42
U.S. Cl. 260—543 P       3 Claims

ABSTRACT OF THE DISCLOSURE

A method of adding sulfur to an alkyldihalogenphosphine according to the reaction,

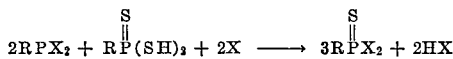

wherein the sulfur reactant

is prepared by reacting a portion of the product

with hydrogen sulfide or metallic hydrosulfide to carry out,

wherein R is an alkyl group, R″ is either hydrogen or a metal, and X is any halide.

DEDICATORY CLAUSE

The invention described herein may be manufactured, used, and licensed by or for the Government for governmental purposes without the payment to us of any royalty thereon.

CROSS REFERENCE

This application is a continuation-in-part of our previously filed application bearing Ser. No. 8,694, filed Feb. 4, 1970.

SPECIFICATION

Our invention relates to a method for adding sulfur to an alkyldihalogenphosphine according to the reaction,

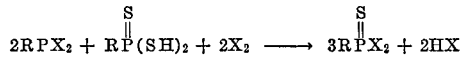

wherein the sulfur reactant

is prepared by reacting a portion of the product

with hydrogen sulfide or metallic hydrosulfide to carry out,

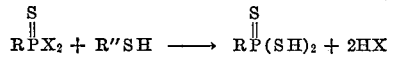

wherein R is an alkyl group, R″ is either hydrogen or a metal, and X is any halide. The sulfides produced by our new method have utility as intermediates in industries using phosphorous esters.

A prior art method involved the direct addition of sulfur to an alkyldihalogenphosphine, and this method presented the problem that the alkyldihalogenphosphine was required to be relatively pure. Alkyldihalogenphosphines are made by a high temperature methanization from phosphorous trihalide, and attempts to carry this conversion above approximately 20 percent have not been successful. The product of the high temperature methanization is a mixture of approximately 20 percent alkyldihalogenphosphine and 80 percent of phosphorous trihalide, and this mixture must be separated before the addition of sulfur is carried out. The separation of the alkyldihalogenphosphine and the phosphorous trihalide is accomplished by a distillation process which requires numerous stages, because the materials to be separated are similar and the boiling point spread is small. Such distillation requires equipment that is expensive, and the process involves a high capital investment. Our invention was conceived and reduced to practice to solve the problems in the prior art of requiring the separation technique and the relatively pure alkyldihalogenphosphine starting material and to satisfy the long felt need for a method of economically producing alkyldihalogenphosphine sulfides without the exhaustive distillation step.

The principal object of our invention is to provide a method for the production of alkyldihalogenphosphine sulfides which is economical and simple to operate.

Another object of our invention is to provide a method for the production of alkyldihalogenphosphine sulfides which does not require a high purity of alkyldihalogenphosphine starting material or a distillation step to separate phosphorous trihalide from the alkyldihalogenphosphine prior to the addition of sulfur.

Other objects of our invention will be obvious or will appear from the specification hereinafter set forth.

While any alkyldihalogenphosphine sulfide can be manufactured by our general process according to the reaction,

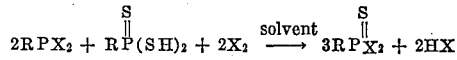

wherein the

is prepared by recycling a part of the product stream according to the reaction,

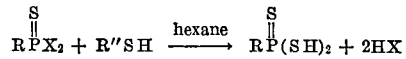

wherein R is an alkyl group, R″ is either hydrogen or a metal, and X is any halogen; a preferred embodiment of our new process is carried out according to the reactions,

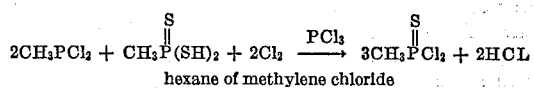

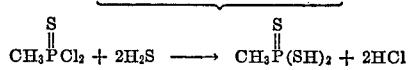

The process is particularly convenient and simple in its operation. Phosphorous trichloride ($PCl_3$) is used as a solvent in the sulfur addition step, and the quantity of $PCl_3$ used is that resulting from the manufacture of methyldichlorophosphine ($CH_3PCl_2$) which is normally between 4–8 moles of $PCl_3$ to 1 mole of $CH_3PCl_2$. The high temperature methanization of $PCl_3$ to $CH_3PCl_2$ has been described in the literature by Dr. Quinn of Food Machinery and Chemical Co. in 1954 and further description is not necessary for the production of this starting material. The reactant mixture subsequent to the product chiller from the reactor and prior to distillation is used as the reactant media for the performance of the first reaction of this invention described immediately above. The composition of this mixture is normally approximately 4 moles of PCl₃ to one mole of CH₃PCl₂. To this mixture of reactant and solvent is added $$CH_3\overset{\overset{S}{\|}}{P}(SH)_2,$$

and chlorine is introduced as a gas to this mixture of reactants. The mole ratios are approximately as follows:

$$Cl_2 = 2,$$

$$CH_3PCl_2 = 2,$$

$$CH_3\overset{\overset{S}{\|}}{P}(SH)_2 = 1,$$

$$PCl_3 = 4-8 \text{ Moles}$$

It is relatively important that the chlorine mole ratio not exceed the CH₃PCl₂ ratio to avoid the formation of PCl₅ in the product. The reaction may be run at atmospheric conditions under reflux of the solvent PCl₃, and the reflux temperature will be established by the relative mole ratios of the various ingredients. The initial boiling point of the mixture is approximately 90° C. and the terminal boiling point is 30–50° C. higher depending on the degree of conversion and the final mole ratios of reactants and final products. During this reaction, the hydrogen chloride will be evolved as gas. The reaction time is dependent upon the rate of chlorine addition and typical reaction times have been less than an hour. The appropriate amount of chlorine depends on the reactants present in accordance with the mole ratios given above. The addition of chlorine requires between a half and one hour at reflux temperatures. Chlorine is added at a rate such that total reflux and boiling can be maintained. The reactants produced are separated by distillation and the PCl₃ solvent is recycled to the high temperature methanization process for preparation of more methyldichlorophosphine. The recycle of this material does not require additional purification. The process involves recycle and, therefore, single pass yields are irrelevant. Conversion of starting materials CH₃PCl₂ and $$CH_3\overset{\overset{S}{\|}}{P}(SH)_2$$

or 80% can be obtained. In a separate reactant vessel a portion of not less than ⅓ of the methyldichlorophosphine sulphide produced by the first reaction is reacted with gaseous hydrogen sulphide in a mole ratio of 1–2 to produce $$CH_3\overset{\overset{S}{\|}}{P}(SH)_2,$$

one of the required starting materials for recycle to the first reaction. This reaction is carried at the reflux temperature approximately 80–90° C. of the hexane of methylene chloride at 50–60° C. with a mole ratio of approximately 5 moles of solvent to one mole of methyldichlorophosphine sulphide. Conversions of methyldichlorophosphine sulphide to produce $$CH_3\overset{\overset{S}{\|}}{P}(SH)_2,$$

better than 90% are obtained.

The hydrogen halide may be removed from the end product by any conventional technique such as carrying out the reaction under reduced pressure, partial thiol addition to eliminate the requirement of hydrogen halide separation, by reacting at or near the atmospheric boiling point of the reaction mixture to strip off the hydrogen halide, or by reacting in the presence of a base or acid separator.

If desired, phosphorous trihalide may be used as reaction media for the halogenation step.

The method of our invention is applicable to either laboratory scale manufacture or to production quantity manufacture, and the quantities to be used are adjustable within the skill of the art.

In our recycle method for adding sulfur to alkyldihalogenphosphines, the recycle process uses a portion of the product of the sulfur addition (alkyldihalogenphosphine sulfide) after hydrolysis with hydrogen sulfide or a metallic hydrosulfide. This hydrolysis product is then reacted with alkyldihalogenphosphine and halogen to provide additional alkyldihalogenphosphine sulfide product, a portion of which is hydrolyzed to continue the cyclic process.

The alkyl phosphorus sulfide product of our new process can be converted to an ester by conventional esterification technique.

We wish it to be understood that we do not desire to be limited to the exact details shown and described in the specification for obvious modifications will occur to a person skilled in the art.

We claim:

1. A method for the addition to sulfur to methyl dichlorophosphine comprising the steps of:
   reacting methyl dichlorophosphine with a recycled hydrolized reactant product, $$CH_3\overset{\overset{S}{\|}}{P}(SH)_2,$$

in the presence of phosphorous trichloride,
   continuously introducing chlorine gas during said reaction,
   maintaining said reaction under reflux condition of said phosphorous trichloride to produce methyl dichlorophosphine sulfide and hydrchloric acid,
   reacting a portion of said methyl dichlorophosphine sulfide with a gaseous hydrogen sulfide in the presence of a hexane of methylene chloride to produce said hydrolized reactant product, $$CH_3\overset{\overset{S}{\|}}{P}(SH)_2,$$

and hydrochloric acid,
   separating said hydrochloric acid, and
   recycling said hydrolized reactant product for reaction with said methyl dichlorophosphine in accordance with the first step of the method.

2. The method according to Claim 1 wherein the mole ratios of the reaction are approximately:

$$Cl_2 = 2$$

$$CH_3PCl_2 = 2$$

$$CH_3\overset{\overset{S}{\|}}{P}(SH)_2 = 1$$

and the boiling point is initially approximately 90° C. with and approximately 30–50° C. higher terminal boiling point.

3. The method according to Claim 2 wherein the reactants are separated by distillation.

No references cited.

LORRAINE A. WEINBERGER, Primary Examiner.

R. D. KELLY, Assistant Examiner